J. W. BLODGETT.
METHOD OF MANUFACTURING REINFORCED AIR TUBES.
APPLICATION FILED DEC. 4, 1914.
1,162,745.                                           Patented Dec. 7, 1915.
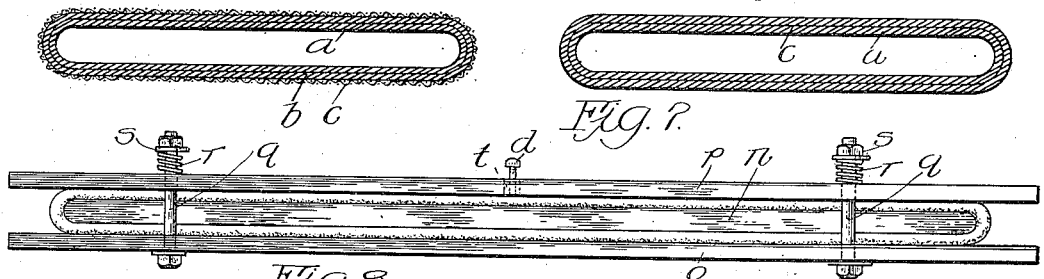
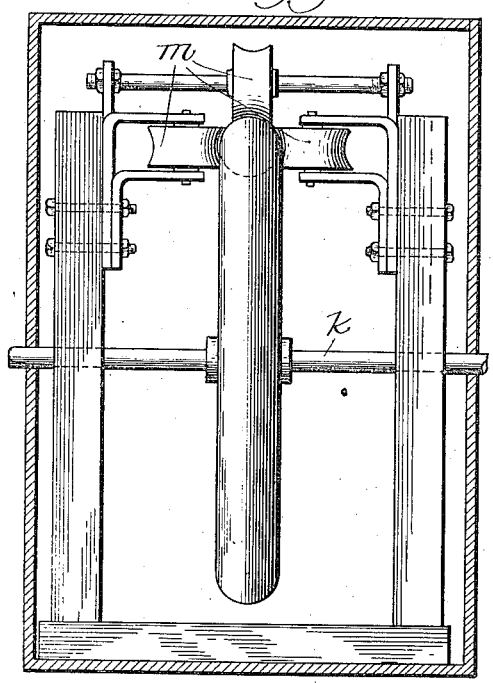
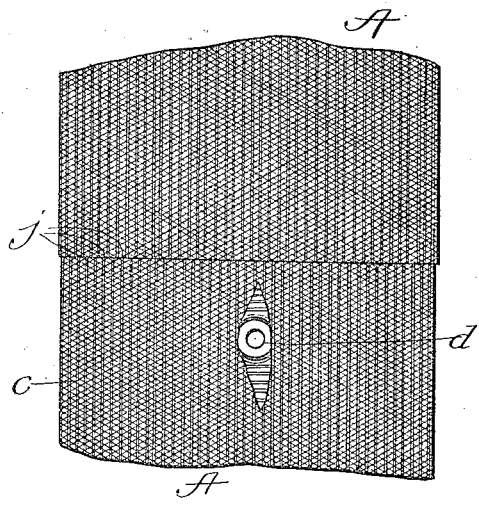
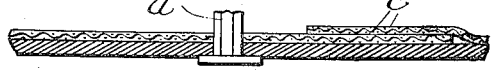
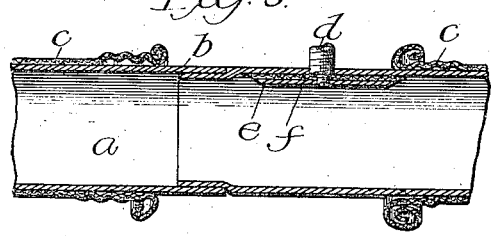
Witnesses:
Carl G. Anderson
C. H. Roesner
Inventor:
John W. Blodgett,
By John Howard McElroy
his Atty.

UNITED STATES PATENT OFFICE.

JOHN W. BLODGETT, OF CHICAGO, ILLINOIS.

METHOD OF MANUFACTURING REINFORCED AIR-TUBES.

1,162,745.  Specification of Letters Patent.  Patented Dec. 7, 1915.

Original application filed July 9, 1913, Serial No. 778,040. Divided and this application filed December 4, 1914. Serial No. 875,430.

*To all whom it may concern:*

Be it known that I, JOHN W. BLODGETT, a citizen of the United States, and a resident of Chicago, in the county of Cook and State of Illinois, have invented certain new and useful Improvements in Methods of Manufacturing Reinforced Air-Tubes, of which the following is a full, clear, and exact specification.

My invention is concerned with a novel method of making reinforced air tubes for pneumatic tires of the character shown in my application, No. 778,040, filed July 9, 1913, of which the present application is a division.

As inner or air tubes have been constructed prior to my invention, they have been made of rubber unreinforced, with the result that once they become punctured under a heavy pressure, the tendency to tear the rubber and thus enlarge the puncture is unresisted save by the strength of the rubber, which, for a thin flexible air-tube, is necessarily limited. Furthermore, the unreinforced rubber, after it has been cured a certain length of time, loses its life or becomes rotten, so that it is readily punctured, torn or blown out.

In my invention, I reinforce the air tube by embedding therein a tubular annulus of a loosely meshed fabric, preferably knitted, so that the fabric, owing to its loose mesh, can expand and contract with the rubber as the tube is inflated or deflated. This reinforcement serves to make punctures less frequent and blow-outs more difficult, and also to prevent their enlargement once they are made, and it also serves to give longer life to the tube, as the reinforced rubber, as it becomes more or less rotten will resist a puncture or blow-out much longer than would a similarly rotted and unreinforced tube.

To illustrate my invention, I annex hereto a sheet of drawings, in which the same reference characters are used to designate identical parts in all the figures, of which,—

Figure 1 is a cross section through an air tube embodying my invention as it appears in the process of manufacture; Fig. 2 is a similar view as it appears completed; Fig. 3 is a longitudinal section through the same on a smaller scale, as it appears during the process of manufacture before the ends of the knitted-fabric tube are joined; Fig. 4 is a top plan view of the same, flattened as it appears in Fig. 1, showing how the joint is formed in the fabric and how the valve is inserted; Fig. 5 is a view in section on the line A—A of Fig. 4; Fig. 6 is a longitudinal section through the tube adjacent the valve, as it appears when it is completed; Fig. 7 is a side elevation of a filler press that may be employed in the manufacture of my improved air tube; and Fig. 8 is a sectional view of a coating apparatus, which also may be employed in carrying out my invention.

In carrying out my invention, I first place a layer of raw rubber of a fine quality upon a hollow curing mandrel, forming a tube of the uncured rubber on the mandrel, after which the uncured rubber is wrapped firmly on the mandrel with a wrapper so as to hold it tightly against the same while it is being cured. I then admit the proper amount of steam to the interior of the mandrel, which, of course, will be provided with the necessary cocks to control the admission of the steam and its escape from the mandrel and the rate at which it passes through the same so as to control the heat imparted to the rubber. A sufficient degree of heat is applied to the mandrel for a sufficient length of time to thoroughly cure the inner surface of the rubber in contact with the outer surface of the mandrel, but not enough to cure the outer surface of the rubber, which is protected by the wrapping. This results in producing a thin tube, the inner surface of which is cured, while the outer surface is raw or only partially cured. This portion of the completed tube is indicated in the drawings by the reference character *a*. Over this partially cured tube, I place a layer *b* of raw rubber, thick enough completely to embed the reinforcing fabric hereinafter described, and this layer of raw rubber will, of course, be of uniform thickness throughout, and may be of a quality inferior to that employed in making the inner portion *a*. After the tube has been thus far completed, the reinforcing fabric *c* is placed on the same, and it may be placed on the tube while it is still on the mandrel, and I preferably form this fabric by knitting it in the form of a tube very loosely over the mandrel. This fabric, when I employ my method in making air tubes, is knitted very loosely, so that it can be expanded under pressure, and contract automatically with the infolding rubber when the pressure is released. After the fabric has been placed over the tube, the ends of the fabric are joined so as to make the fabric practically an endless annular tube, and this joining is preferably done in the manner shown in Figs. 3, 4 and 5.

In Fig. 3, the ends of the tube made up of the inner layer having its inner surface cured with its outer surface raw, and the outer layer $b$ of raw rubber covering the same, are telescoped, as shown, and joined by some suitable cement. The valve $d$ is passed through the rubber tube near the joint, and the tube is preferably reinforced on the inner side at this point by a layer of fabric $e$, next to the tube proper, and beneath this is a layer of rubber $f$, the two extra layers being cemented in place. As the tube is built up, after the ends of the fabric have been joined as hereinafter described, I preferably build up the tube surrounding the valve by adding extra layers $g$, $h$ and $i$ of rubber, which layers combine to thicken the tube at this point and do away with the necessity of a bridge, and the valve, which is put in place while the tube is being built up of the raw rubber and fabric, is in place while the tube is cured, so that an air-tight joint is made between the valve and the tube surrounding the same, and the customary bridge is dispensed with. After the ends of the rubber part of the tube are thus telescoped and the valve inserted, the ends of the fabric tube $c$ are drawn together and overlapped, as shown in Figs. 4 and 5, and the fabric tube where it passes over the valve $d$ is not punctured or cut to permit the passage of the valve, but the loosely knit mesh of the fabric is drawn apart far enough to permit the passage of the valve, which is thus forced through without breaking or cutting any of the strands, and thus weakening the tube at this point. The overlapped ends of the tube $c$ may be secured by cementing them together, or I may employ the stitches $j$ shown in Fig. 4 as applied to a portion of the joint. One method of completing the tube thus far formed is to inflate the same and place it upon a suitable rim mounted on a shaft $k$ suitably mounted in supports so as to rotate in a steam-jacketed oven $l$, which may be opened at one side to give access to the same. Suitably journaled to engage with the sides and outer surface of the inflated tube are a series of rollers $m$ having their concave peripheries of the proper degree of curvature to engage the surface of the inflated tube, and the exterior of the tube may be given a coating of raw rubber, which is smeared on the same and forced in by the rolls $m$ as the shank $k$ is rotated by any suitable power. With this outer coating of rubber, the incomplete tube, now made up of the partially cured inner portion of the tube with the layer of raw rubber on that, and the reinforcing fabric in turn surrounding the layer of raw rubber, with an outside casing of additional raw rubber, is now placed in a proper curing mold, with the proper amount of water and compressed air in it before the mold is heated. The mold must be of the proper size for the tube which is to be made, and the effect of heating the expanded tube is first to soften the raw rubber which is within the fabric, and the pressure of the air and water within the expanded tube serves to force the softened raw rubber through the meshes of the fabric to meet the outer coating of raw rubber, and the raw rubber outside of the fabric is forced against the curing mold, and the further application of heat to the mold, which will be properly regulated for the purpose, serves to cure completely not only the raw rubber that has been applied to the partially cured tube and to the fabric, but also to complete the curing of the inner layer of the tube. It will be understood that the outer coating of raw rubber might be omitted, but I preferably employ the same in order to make the outer surface of the completed tube smooth, instead of rough, as it would be without the coating applied to the outer side thereof. When the tube is thus completed, it will be apparent that I have produced a comparatively thin air tube that is reinforced by an elastic and expansible fabric so that said air tube can be inflated as may be necessary, and thus serve the purpose of the unreinforced air tube, while at the same time it has the greater strength and consequent longer life before mentioned.

Instead of depending upon the expansion due to the water and compressed air in the joined tube to force the raw rubber outward through the meshes of the fabric, I may employ the following apparatus: In the alternative form, the process is carried on in the same manner up to the point of telescoping the ends and joining them, but in the modification, before this is done, the tubes are placed side by side in a flat press, and a heavy pressure may be simultaneously thus applied to a large number of the flattened tubes, and with the press heated in any of the well known manners sufficiently to soften, but not to cure the rubber, the combined effect of the heat and pressure is to force the softened rubber outward through the fabric so that the latter becomes permeated with the raw rubber. The ends of the tubes can then be joined by overlapping and cementing the same, and they may be placed in the special filler press illustrated in Fig. 7, in which one or more of the joined tubes are placed about a hollow plate-like mandrel $n$ which is placed between the bottom plate $o$ and the top plate $p$, which plates are held together by the bolts $q$ passing therethrough, and the pressure of the plates on the tubes surrounding the mandrel *n* may be regulated by the helically-coiled expanding springs *r* surrounding the bolts between the plate *p* and the nuts *s* threaded on said bolts. The valves *d* of course project up through suitable apertures *t*, indicated in dotted lines in Fig. 7, which apertures are formed in the plate *p*. The tube or tubes thus held under pressure are heated sufficiently to soften, but not cure the rubber, so that the telescoped parts will be thoroughly joined. In case the outer coating of raw rubber is to be applied in this modified process, the coating of raw rubber may be applied before the tubes are cured in the same manner as set out in the previous description of the preferred method of forming the tubes. When the raw rubber is all added and the fabric frictioned by the pressure above described, the tube is cured in the customary manner.

While I have shown and described my invention as carried out by the steps which I at present consider best adapted to secure the desired results, it will be understood that it is capable of modifications, and that I do not desire to be limited in the interpretation of the following claims, except as may be necessitated by the state of the prior art.

What I claim as new, and desire to secure by Letters Patent of the United States, is:

1. The process of manufacturing a reinforced air tube, which consists in curing the inner surface only of a rubber tube by the application of curing heat to the inner surface only; in covering the uncured outer surface of the tube with a layer of raw rubber; in placing over the said raw rubber a loosely meshed fabric; and in finally subjecting the tube to pressure and heat so that the raw rubber will first pass through the meshes of the fabric and then subsequently be cured to the outer surface of the initial tube, leaving the fabric completely embedded in completely cured rubber.

2. The process of manufacturing a reinforced air tube, which consists in curing the inner surface only of a rubber tube by the application of curing heat to the inner surface only; in covering the uncured outer surface of the tube with a layer of raw rubber; in placing over the said raw rubber a loosely meshed fabric; in forming over the fabric tube a raw rubber tube; and in finally subjecting the tube to pressure and heat so that the raw rubber will first pass through the meshes of the fabric and then subsequently be cured to the outer surface of the initial tube, leaving the fabric completely embedded in completely cured rubber.

In witness whereof, I have hereunto set my hand and affixed my seal, this thirtieth day of September, A. D. 1914.

JOHN W. BLODGETT. [L. S.]

Witnesses:
 JOHN HOWARD MCELROY,
 MILDRED ELSNER.